(12) United States Patent
Chang et al.

(10) Patent No.: US 8,884,631 B2
(45) Date of Patent: Nov. 11, 2014

(54) METHOD AND DEVICE FOR AUTOMATICALLY CALIBRATING TOUCH DETECTION

(75) Inventors: Chin-Fu Chang, Taipei (TW); Cheng-Han Lee, Taipei (TW); Chi-Hao Tang, Taipei (TW)

(73) Assignee: Egalax_Empia Technology Inc., Taipei (TW)

( * ) Notice: Subject to any disclaimer, the term of this patent is extended or adjusted under 35 U.S.C. 154(b) by 735 days.

(21) Appl. No.: 13/113,537

(22) Filed: May 23, 2011

(65) Prior Publication Data

US 2011/0291669 A1   Dec. 1, 2011

Related U.S. Application Data

(60) Provisional application No. 61/349,972, filed on May 31, 2010.

(51) Int. Cl.
*G01R 35/00* (2006.01)
*G06F 3/041* (2006.01)

(52) U.S. Cl.
CPC .................................. *G06F 3/0418* (2013.01)
USPC ........................................................ 324/601

(58) Field of Classification Search
CPC ....... G06F 3/044; G06F 3/0416; G06F 3/041; G06F 2203/04104; G06F 2203/04106; G06F 3/0414; G06F 3/0418
See application file for complete search history.

(56) References Cited

U.S. PATENT DOCUMENTS 5,956,020 A * 9/1999 D'Amico et al. .............. 345/173
8,228,311 B2 * 7/2012 Perski et al. .................. 345/174

FOREIGN PATENT DOCUMENTS

CN   102043551   5/2011

* cited by examiner

*Primary Examiner* — Tung X Nguyen
(74) *Attorney, Agent, or Firm* — WPAT, PC; Justin King

(57) ABSTRACT

A method and device for automatically calibrating touch detection is disclosed. The present invention includes providing a sensing layer including a plurality of sensors, and each sensor senses a sensing range, and the sensing ranges of the sensors intersecting each other to form a crossing array; continuously detecting signals of the sensors as a detection signal set; performing update of an initial signal set based on the detection signal set; and when a default signal set does not match the initial signal set and the default signal set matches the detection signal set, performing update of the initial signal set.

19 Claims, 10 Drawing Sheets

METHOD AND DEVICE FOR AUTOMATICALLY CALIBRATING TOUCH DETECTION

BACKGROUND OF THE INVENTION

1. Field of the Invention

The present invention relates to a touch device and method, and more particularly, to a device and method for automatically calibrating touch detection.

2. Description of the Prior Art

Referring to FIG. 1, a schematic diagram depicting the structure of a touch device 10 is shown. The touch device 10 includes a controller 11 and a sensing unit 12. The sensing unit 12 includes a sensing arrangement consisting of a plurality of sensors 122, wherein each sensor 122 electrically connects to the controller 11. The controller 11 provides driving signals to the sensing unit 12, and the sensing unit 12 receives signals generated by the sensors corresponding to the driving signals.

When there is no external object 13 (e.g. a finger) touching or near the sensing unit 12, sensors 122 arranged on the same dimension (e.g. x axis or y axis) will receive signals shown in FIG. 2, which can be used as a baseline for touch detection. When the external object 13 touches the sensing unit 12, signals received may be one similar to that shown in FIG. 3. By comparing it with the baseline, the touch location of the external object 13 on the sensing unit 12 can be detected.

However, if an external object 13 is near or touches the sensing unit while baseline detection is carried out, it will cause error in the detection of the baseline, which further leads to inaccurate detection of subsequent touch locations. Therefore, an improved design is needed to overcome the abovementioned disadvantages.

From the above it is clear that prior art still has shortcomings. In order to solve these problems, efforts have long been made in vain, while ordinary products and methods offering no appropriate structures and methods. Thus, there is a need in the industry for a novel technique that solves these problems.

SUMMARY OF THE INVENTION

In the light of forgoing drawbacks, an objective of the present invention is to provide a device and method for automatically calibrating touch detection, which continuously updates signals of a plurality of sensors as a detection signal set and periodically detects signals as an initial signal set. The initial signal set is compared with a fixed default signal set to determine if the updated initial signal set is misjudged, and if so, the detection signal set is compared with the default signal set to determine a time at which the sensors are not touched for updating the initial signal set.

In addition, when the detection signal set mismatches the default signal set, the initial signal set is assumed to be correct to avoid waiting forever for the update of the initial signal set in the case of an inaccurate default signal set.

An objective of the present invention and a solution of addressing its technical problem are achieved by the following technical scheme. A device for automatically calibrating touch detection proposed by the present invention includes: a sensing layer including a plurality of sensors, each sensor sensing a sensing range, and the sensing ranges of the sensors intersecting each other to form a crossing array; and a sensing unit including: a sensing circuit for performing the operations of: continuously detecting signals of the sensors as a detection signal set; and when a default signal set does not match an initial signal set and the default signal set matches the detection signal set, performing update of the initial signal set.

An objective of the present invention and a solution of addressing its technical problem can also be achieved by the following technical measures.

The sensing unit further includes determining a location of at least one external object based on the detection signal set when the default signal set does not match the initial signal set and the default signal set does not match the detection signal set.

The sensing unit further includes determining a location of at least one external object based on the detection signal set when the default signal set matches the initial signal set.

The update of the initial signal set is performed continuously until the default signal set matches the initial signal set.

Matching of the default signal set and the initial signal set includes matching of a value representing the default signal set and a value representing the initial signal set and/or matching of the default signal set and the detection signal set includes matching of a value representing the default signal set and a value representing the detection signal set.

The sensing layer includes a plurality of first sensors and a plurality of second sensors, the first sensors and the second sensors overlapping at a plurality of intersecting points.

Each value of the detection signal set corresponds to a differential signal of a different pair of sensors, and a pair of sensors to which each value corresponds have at least one sensor that is different from another pair of sensors to which another value corresponds, wherein the detection signal set includes at least one zero-crossing point when the at least one external object touches the sensors.

Each value of the detection signal set corresponds to a difference between differential signals of two pairs of sensors among three sensors, and three sensors to which each value corresponds have at least one sensor that is different from three sensors to which another value corresponds, wherein the detection signal set include an even number of zero-crossing points when the at least one external object touches the sensors.

The three different sensors among the sensors are not adjacent to one another.

The sensing unit includes a storage element for storing the default signal set and the initial signal set.

An objective of the present invention and a solution of addressing its technical problem are achieved by the following technical scheme. A method for automatically calibrating touch detection proposed by the present invention includes: providing a sensing layer including a plurality of sensors, each sensor sensing a sensing range, and the sensing ranges of the sensors intersecting each other to form a crossing array; continuously detecting signals of the sensors as a detection signal set; performing update of an initial signal set based on the detection signal set; and when a default signal set does not match the initial signal set and the default signal set matches the detection signal set, performing update of the initial signal set.

An objective of the present invention and a solution of addressing its technical problem can also be achieved by the following technical measures.

The method for automatically calibrating touch detection further includes determining a location of at least one external object based on the detection signal set when the default signal set does not match the initial signal set and the default signal set does not match the detection signal set.

The method for automatically calibrating touch detection further includes determining a location of at least one external object based on the detection signal set when the default signal set matches the initial signal set.

The update of the initial signal set is performed continuously until the default signal set matches the initial signal set.

Matching of the default signal set and the initial signal set includes matching of a value representing the default signal set and a value representing the initial signal set and/or matching of the default signal set and the detection signal set includes matching of a value representing the default signal set and a value representing the detection signal set.

The sensing layer includes a plurality of first sensors and a plurality of second sensors, the first sensors and the second sensors overlapping at a plurality of intersecting points.

Each value of the detection signal set corresponds to a differential signal of a different pair of sensors, and a pair of sensors to which each value corresponds have at least one sensor that is different from another pair of sensors to which another value corresponds, wherein the detection signal set includes at least one zero-crossing point when the at least one external object touches the sensors.

Each value of the detection signal set corresponds to a difference between differential signals of two pairs of sensors among three sensors, and three sensors to which each value corresponds have at least one sensor that is different from three sensors to which another value corresponds, wherein the detection signal set include an even number of zero-crossing points when the at least one external object touches the sensors.

The three different sensors among the sensors are not adjacent to one another.

With the above technical schemes, when an external object touches or approaches the sensing unit, the present invention avoids misjudgment of subsequent touch locations due to error in the baseline.

The above description is only an outline of the technical schemes of the present invention. Preferred embodiments of the present invention are provided below in conjunction with the attached drawings to enable one with ordinary skill in the art to better understand said and other objectives, features and advantages of the present invention and to make the present invention accordingly.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
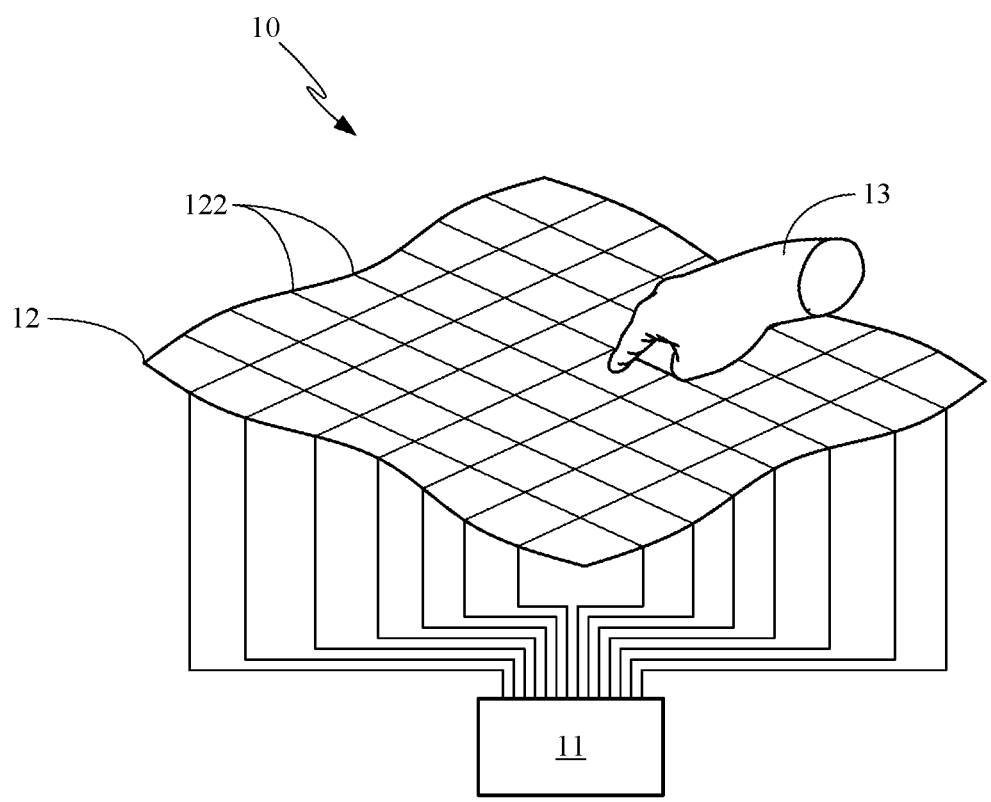
FIG. 1 is a schematic diagram depicting a prior-art touch device.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Figure 4:
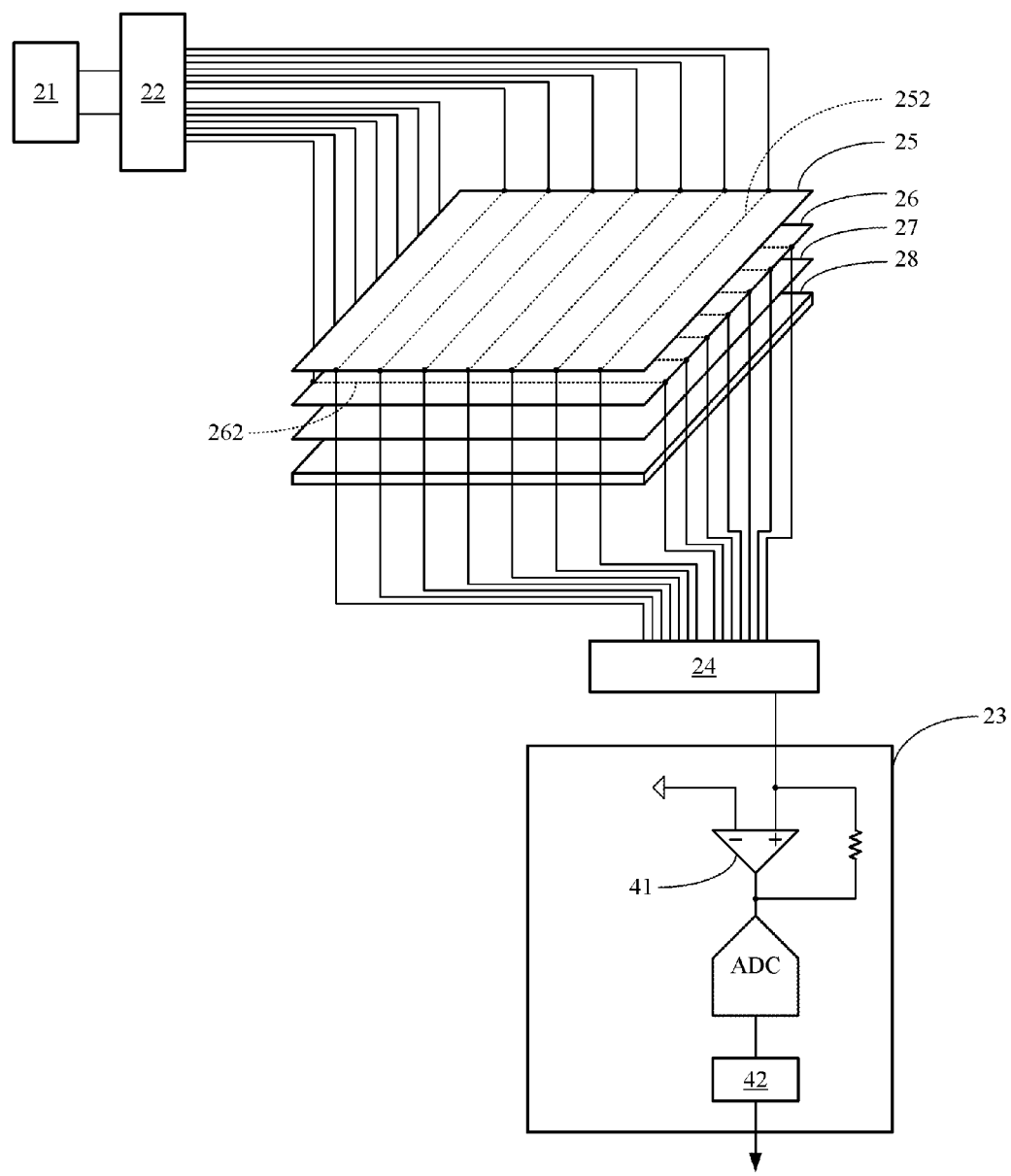
FIG. 4 is a diagram depicting a device for automatically calibrating touch detection of the present invention.

Referring to FIG. 4, a schematic diagram of a touch device 20 of the present invention is shown. The touch device 20 includes a driving unit 21, a driving switching unit 22, a sensing unit 23, a sensing switching unit 24, a first sensing layer 25, and a second sensing layer 26. Moreover, a rear shielding layer 27 can be provided between the device 20 and a display 28.

The first sensing layer 25 has a plurality of first sensors 252, and the second sensing layer 26 has a plurality of second sensors 262. In the descriptions below, the first and second sensors 252 and 262 are sometimes generally referred to as sensors. The driving unit 21 provides driving signals to the first and second sensing layers 25 and 26 via the driving switching unit 22, and the sensing unit 23 receives signals of the first and second sensing layers 25 and 26 via the sensing switching unit 24. One skilled in the art can recognize that the driving switching unit 22 and the sensing switching unit 24 can constitute selecting elements, including but not limited to, switches, multiplexers and so on to operatively or selectively coupling to the sensors. Further, one skilled in the art can appreciate that the driving unit 21, the driving switching unit 22, the sensing unit 23, and the sensing switching unit 24 can be integrated into a single control device.

In an example of the present invention, the touch device 20 implements self-capacitive sensing. The sensing unit 23 receives signals via sensors driven by the driving signals. One skilled in the art can appreciate that the driving switching unit 22 and the sensing switching unit 24 can be combined together. Further, in an example of the present invention, the touch device 20 implements mutual-capacitive sensing. The sensing unit 23 receives signals via sensors not driven by the driving signals, such as via sensors adjacent or at a different layer to sensors driven by the driving signals. In yet another example of the present invention, the touch device 20 implements both self-capacitive and mutual-capacitive sensing. The present invention is not limited to self-capacitive and mutual-capacitive sensing. They are well-known to those skilled in the art and will not be described in details.

In the present invention, a sensor can constitutes a plurality of conductive sheets and connecting wires, for example, a plurality of connecting wires connecting a group of rhombus- or square-shape conductive sheets. Thus, in an example of the present invention, each sensor senses a sensing range. The plurality of sensors includes the plurality of first and second sensors. The sensing ranges of the first sensors are parallel to each other, and the sensing ranges of the second sensors are parallel to each other. The parallel sensing ranges of the first and second sensors are stacked to form a crossing array. For example, the first and second sensors are lines of infrared sensors arranged laterally and longitudinally, respectively, for sensing vertical and horizontal parallel scanning ranges. The crossings of the vertical and horizontal scanning ranges form a crossing array. Further, the above vertical and horizontal parallel scanning ranges can for example be implemented by parallel capacitive or resistive sensors crossing each other.

The above sensing unit 23 can include a sensing circuit and a touch location detector 42. In an example of the present invention, the sensing circuit can constitute an amplifier 41 used as an integrator and an analog-to-digital converter (ADC). On skilled in the art can appreciate other sensing circuits suitable for the present invention, and no further explanation will be provided. Signals detected by the sensing unit 23 before and after an external touch exerted by an external object 13 can be those shown in FIGS. 2 and 3.

Figure 2:
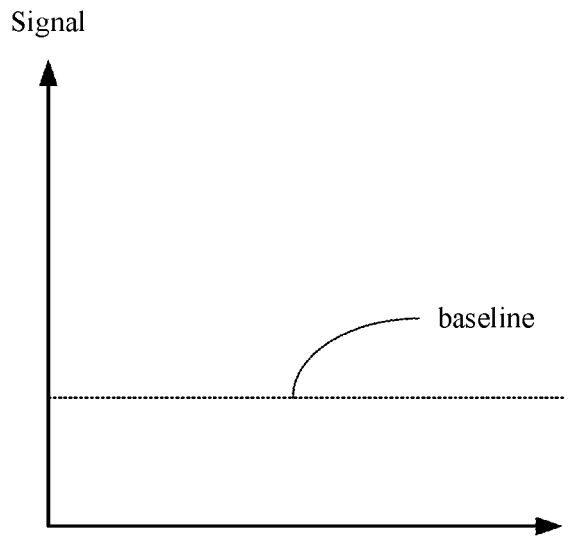
FIG. 2 is a diagram depicting an untouched signal in the prior art.
Figure 3:
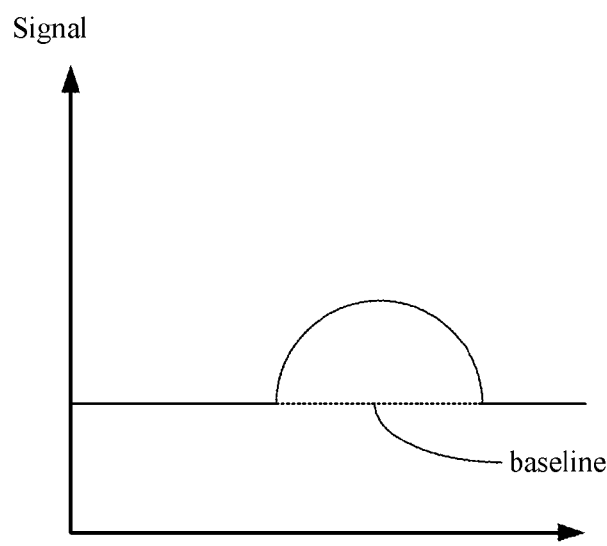
FIG. 3 is a diagram depicting a touched signal in the prior art.

In an example of the present invention, the baseline (as shown in FIG. 2) can be generated based on signals detected by each of the sensors in the same dimension. For example, the baseline is an average value of signals detected by each of the sensors in the same dimension.

The above touch location detector 42 can include a storage element for storing a default signal set (DS). In an example of the present invention, the default signal set DS includes pre-stored signals detected by each sensor, including default signals of the first and second sensors. In an example of the present invention, the default signal set DS can be generated based on signals detected by each sensor. For example, a default signal of the first sensors is the average value of signals detected by the first sensors, and a default signal of the second sensors is the average value of signals detected by the second sensors.

In addition, the storage element of the touch location detector 42 may also store an initial signal set (IS). In an example of the present invention, the initial signal set IS are initial signals detected by each sensors, including initial signals of the first and second sensors. The initial signal set IS are signals detected by the sensing layers when there is no external object 13 touching the device or nearby, for example, the baseline described earlier. In an example of the present invention, the initial signal set IS can be generated by signals detected by each sensor. For example, an initial signal of the first sensors is the average value of signals detected by the first sensors, and a initial signal of the second sensors is the average value of signals detected by the second sensors.

The initial signal set IS and the default signal set DS can be compared to determine whether the initial signal IS is inaccurate, for example, by comparing the initial signal and the default signal of each sensor to see if the initial signal exceeds a threshold, or by comparing the sums or averages of the initial signals and the default signals of all the sensors to see if it exceeds a threshold. Other comparison methods known to those skilled in the art are also applicable, such as comparison of variances or standard deviations.

In addition, the storage element of the touch location detector 42 may also store a detection signal set (S). In an example of the present invention, the detection signal set S are signals detected by each sensors, including detection signals of the first and second sensors. If the initial signal set IS is not misjudged (baseline is accurate), a touch location can be determined by comparing the difference between the initial signal set IS and the detection signal set S. On the other hand, if the initial signal set IS is misjudged, initial signal set IS is repeated generated until it is correct.

In an example of the present invention, the default signal set DS, the initial signal set IS and the detection signal set S can be signals consecutively received by a sensing element (e.g. the above integrator 41) in the above sensing circuit. These signals can also be received from several sensing elements at the same time or received at different times.

Figure 5:
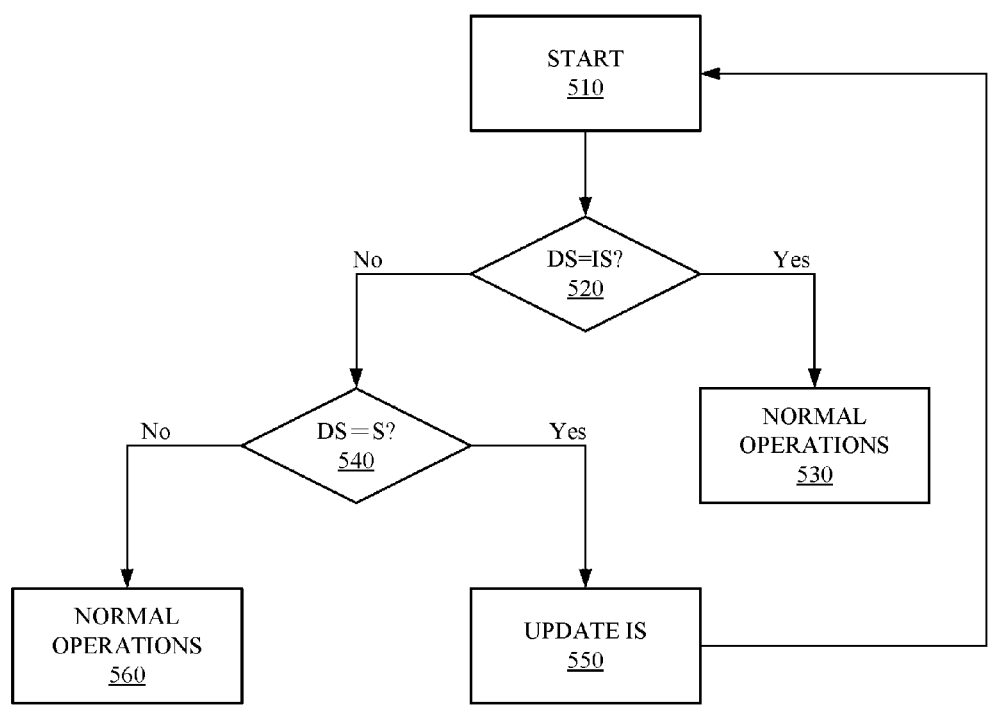
FIG. 5 is a flowchart illustrating a method for automatically calibrating touch detection of the present invention.

In a best mode of the present invention shown in FIG. 5, a method for automatically calibrating touch detection is illustrated. In an example of the present invention, the method for automatically calibrating touch detection can be performed in the touch location detector 42 described above. First, as shown in step 510, a mechanism for automatically calibrating touch detection is activated. The mechanism for automatically calibrating touch detection can be activated at system boot up or reset.

Next, as shown in step 520, the default signal set DS and the initial signal set IS are compared. The default signal set DS can be a set of signal parameters provided at system manufacturing time. Alternatively, a detection signal set S at system manufacturing time can be used as the default signal set DS. In an example of the present invention, the default signal set DS does not change with step 510, while the initial signal set IS are regenerated each time step 510 is executed.

Figure 6:
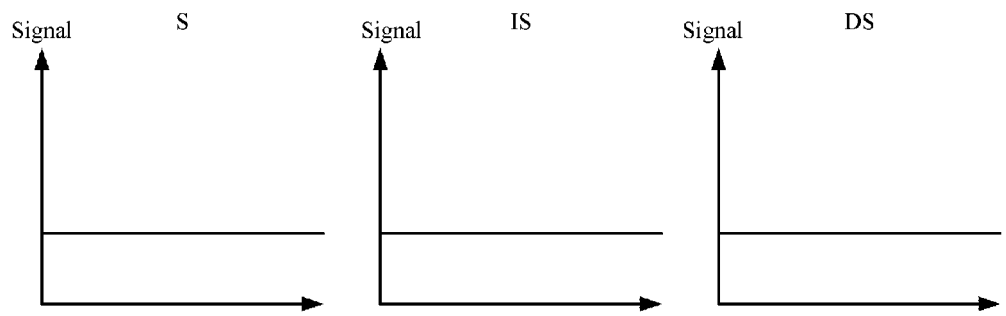
FIGS. 6 to 10 are diagrams depicting signals in the method for automatically calibrating touch detection of the present invention.

When the default signal set DS matches the initial signal set IS, as shown in FIG. 6, normal operations for touch detection are carried out, as shown in step 530. For example, using the initial signal set IS as the baseline and comparing it with the detection signal set S to determine the location of the external object 13. In other words, if, at step 510 where the initial signal set IS are regenerated, the sensing layer is not approached or touched by an external object 13, the default signal set DS matches the initial signal set IS, and normal operations of touch detection can be carried out.

When the default signal set DS does not match the initial signal set IS, then the comparison between the detection signal set S and the default signal set DS is performed, as shown in step 540. When the default signal set DS does not match the initial signal set IS, two scenarios are possible, i.e. either the initial signal set IS is wrong or the default signal set DS is wrong.

Figure 7:
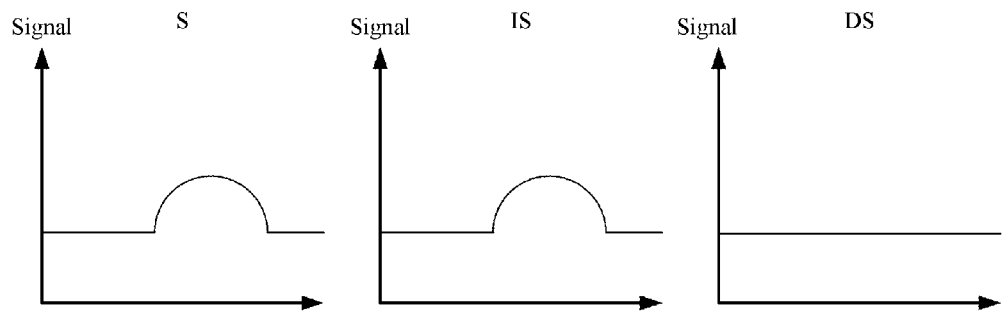
Figure 8:
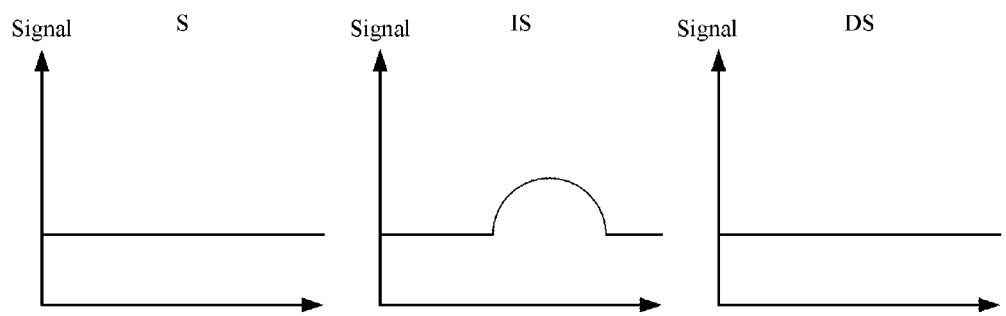
Figure 9:
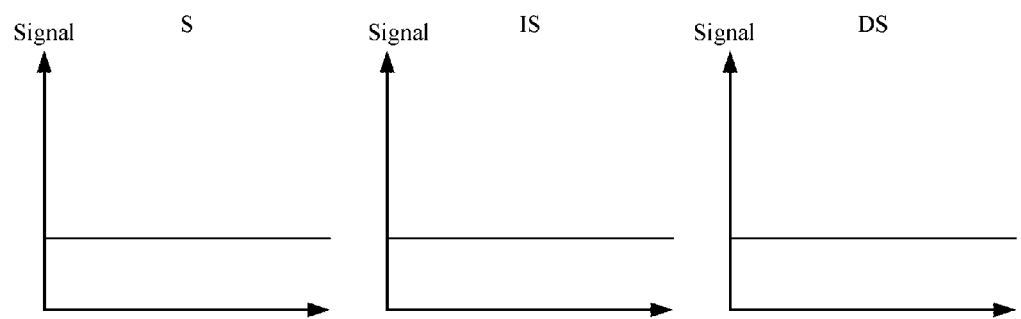

One possible cause for an inaccurate initial signal set IS is that an external object 13 approached or touched the sensing layer when the initial signal set IS was being generated, as shown in FIG. 7. Meanwhile, the detection signal set S are continuously generated, and the initial signal set IS will be similar to the detection signal set S until the external object 13 has moved away or stopped touching the sensing layer, as shown in FIG. 8. When the external object 13 has moved away or stopped touching the sensing layer, and if the detection signal set S matches the default signal set DS, then the initial signal set IS is updated, as shown in step 550. Thereafter, step 510 is repeated. In an example of the present invention, normal operations for touch detection can be carried out following step 550, instead of repeating step 510. Since the external object 13 has moved away or stopped touching the sensing layer, the updated initial signal set IS, the detection signal set S and the default signal set DS all match with each other, as shown in FIG. 9.

Figure 10:
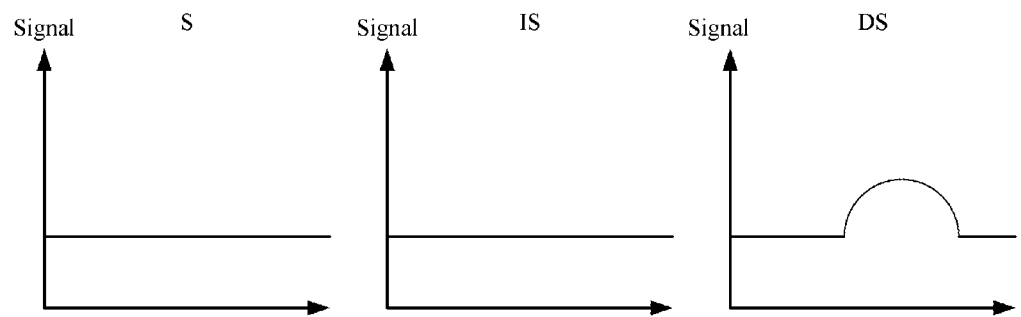

If the detection signal set S does not match with the default signal set DS, as shown in FIG. 10, then the default signal set DS is assumed to be wrong, and normal operations for touch detection are carried out, as shown in step 560. A possible cause for an inaccurate default signal set DS is that an external object 13 approached or touched the sensing layer when the default signal set DS was being generated, or that the touch device 20 is varied or changed due to external factors, in these cases, the default signal set DS will never match the initial signal set IS.

Thus, in the device and method for automatically calibrating touch detection of the present invention, even if the default signal set DS is inaccurate (e.g. in a case where the default signal set DS will never match the initial signal set IS), the touch device 20 can still function properly without misjudging an external object approaching or touching the sensing layer and being unable to update the initial signal set IS, which will cause the touch device 20 to wait forever for the update of the initial signal set IS.

Since the touch device 20 may be affected by the changes in environment, such as changes in temperature or electric field, so the initial signal set IS needs to be updated constantly. Thus, in an example of the present invention, step 510 will be carried out periodically or after certain time has elapsed.

Figure 11:
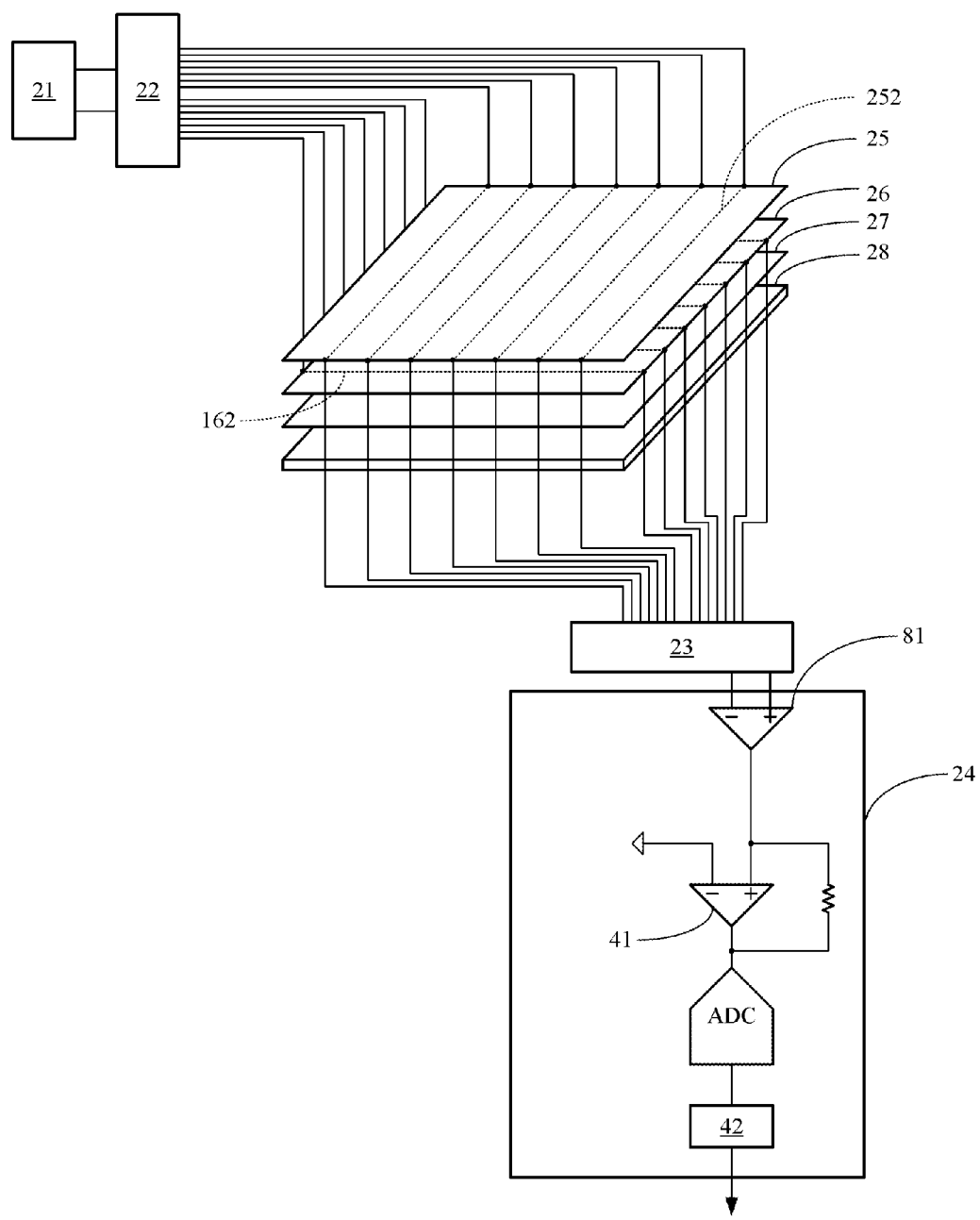
FIG. 11 is a diagram depicting a device for automatically calibrating touch detection using differential signals of the present invention.
Figure 12:
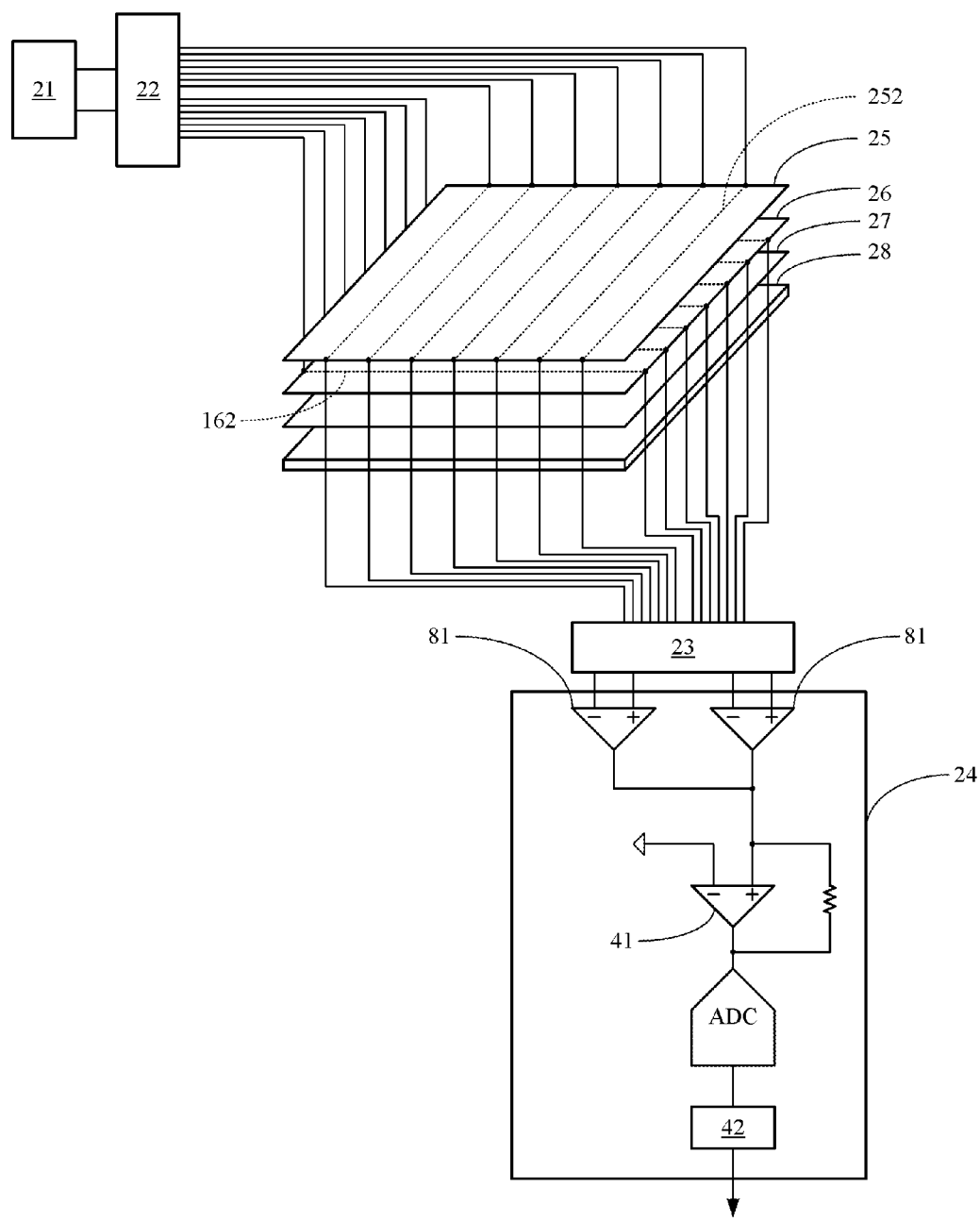
FIG. 12 is a diagram depicting a device for automatically calibrating touch detection using double differential signals of the present invention.

In an example of the present invention, the default signal set DS, the initial signal set IS and the detection signal set S consist of differential signal. For example, as shown in FIG. 11, the signals detected by the sensing circuit are differential signals between two sensors. Thus, when an external object 13 approaches or touches a sensor, the detection signal set S will be that shown in FIG. 13, wherein the difference between two sensors can be processed by an amplifier 81 used as a subtractor. In another example of the present invention, the sensing circuit will detect a signal from the sensor, as shown in FIG. 7, and the touch location detector 42 will subtract this signal from a signal detected by a neighboring sensor to generate a differential signal.

Figure 13:
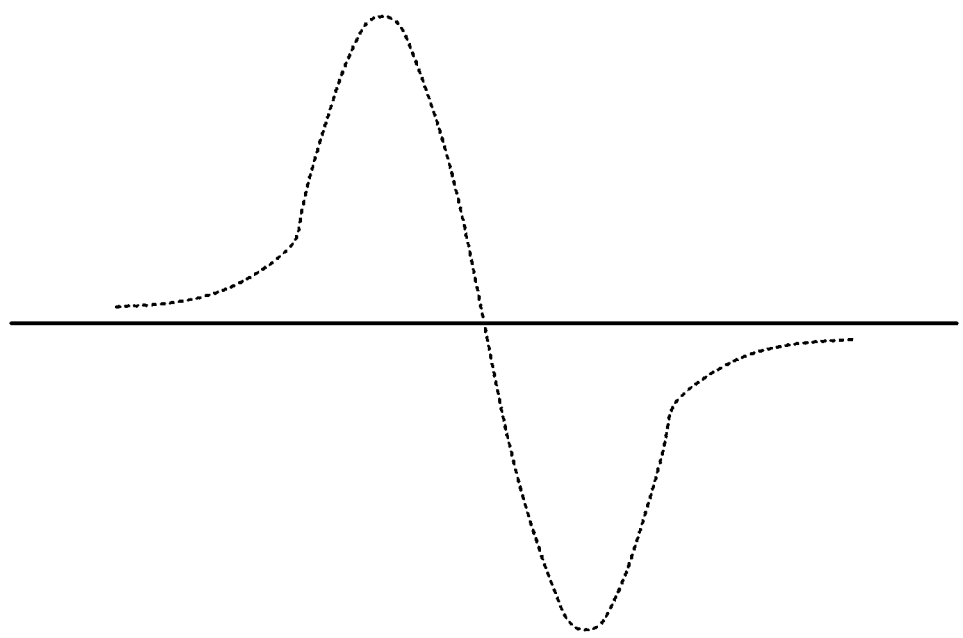
FIG. 13 is a diagram depicting differential signals.

In an example of the present invention, the default signal set DS, the initial signal set IS and the detection signal set S consist of double differential signals. For example, as shown in FIG. 13, the signals detected by the sensing circuit are differential signals between two pairs of sensors. Thus, when an external object 13 approaches or touches sensors, the detection signal sets S will be those shown in FIGS. 14 and 15. In another example of the present invention, the sensing circuit will detect signals from the sensors, as shown in FIG. 7, and the touch location detector 42 will subtract the signals detected by two pairs of neighboring sensors to generate double differential signals.

In an example of the present invention, the differential signal can be the sum of the difference in signals of two pairs of sensors. These two pairs of sensors can be three sensors adjacent or not adjacent to one other. For example, the aforementioned at least three sensors can include a first sensor, a second sensor and a third sensor, and their signals are first, second and third signals, respectively. The two pairs of sensors are a first pair of sensors consisting of the first and second sensors and a second pair of sensors consisting of the second and the third sensors, and the differential signal is the difference between the second and the first signals plus the difference between the second and the third signals.

Figure 14:
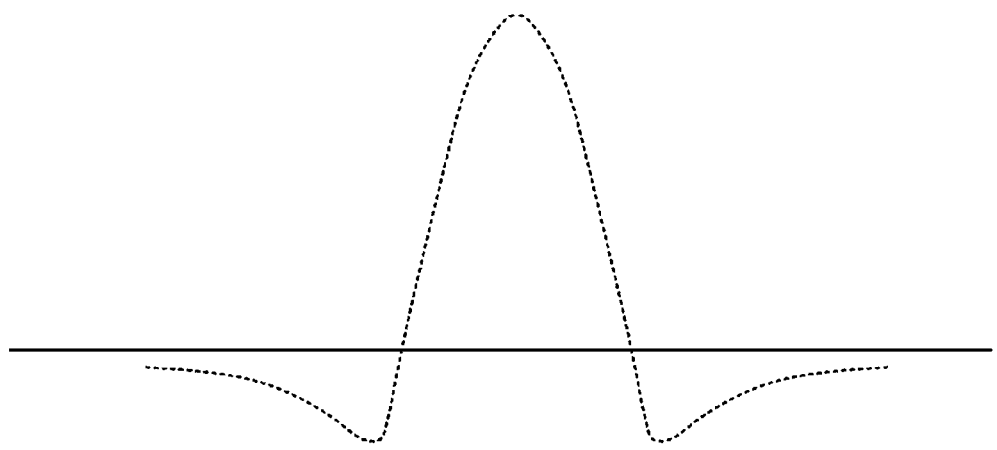
FIG. 14 and FIG. 15 are diagrams depicting double differential signals.

For example, the two pairs of sensors are formed from three adjacent sensors. Each differential signal is generated based on signals from these three sensors. FIG. 14 is a drawing depicting differential signals generated based on signals from three adjacent sensors corresponding to a touch action.

Figure 15:
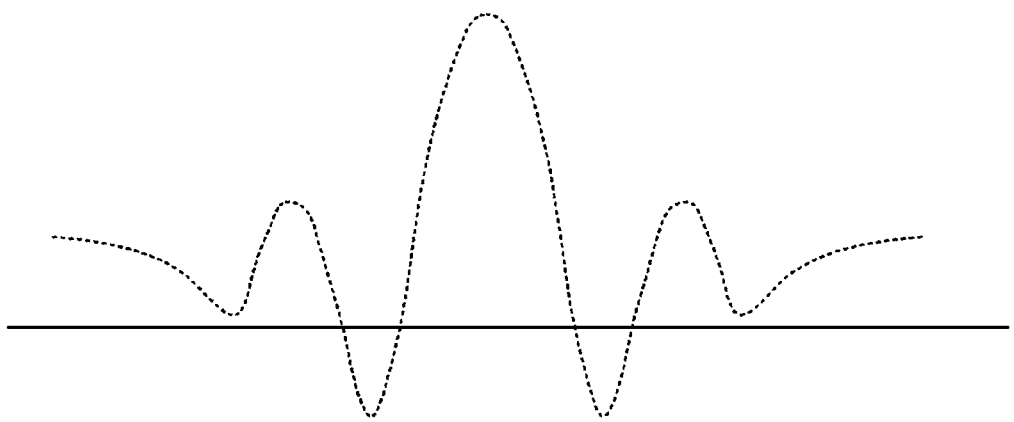

Alternatively, for example, the two pairs of sensors are formed from three non-adjacent sensors. Each differential signal is generated based on signals from these three non-adjacent sensors. For example, there is at least one sensor provided between the first and the second sensors and at least one sensor provided between the second and the third sensors. FIG. 15 is a drawing depicting, corresponding to a touch action, differential signals generated based on signals from three sensors with one other sensor separated between each pair thereof.

In another example of the present invention, the differential signal can be the sum of differences between multiple pairs of sensors that can constitute a plurality of adjacent or non-adjacent sensors. For example, the multiple pairs of sensors can include four pairs of sensors established from five individual sensors: first, second, third, fourth and fifth sensors; their signals are first, second, third, fourth and fifth signals, respectively. Thus, the differential signal is (second signal–first signal)+(third signal–second signal)+(third signal–fourth signal)+(fourth signal–fifth signal), which equals to (third signal–first signal)+(third signal–fifth signal). Similarly, the non-adjacent sensors will produce a drawing similar to FIG. 15, which shows, corresponding to a touch action, differential signals generated based on signals from three sensors with one other sensor separated between each pair thereof.

In another example of the present invention, the differential signal can be a sum of differences between multiple pairs of sensors constituting an even number of adjacent or non-adjacent sensors. For example, the multiple pairs of sensors can include two pairs, constituting four sensors: first, second, third and fourth sensors; their signals are first, second, third and fourth signals, respectively. Thus, the differential signal is (second signal–first signal)+(third signal–fourth signal).

In the above FIG. 13, each value corresponds to a differential signal of a different pair of sensors. In other words, a pair of sensors to which each value corresponds will have at least one sensor that is different from another pair of sensors to which another value corresponds, thereby forming a detection signal set with one zero-crossing point shown in the drawing when an external object touches the sensors. Similarly, in the above FIGS. 14 and 15, each value corresponds to a difference between differential signals of two pairs of sensors among three sensors; three sensors to which each value corresponds will have at least one sensor that is different from three sensors to which another value corresponds, thereby forming a detection signal set with an even number of zero-crossing points shown in each of the drawings when an external object touches the sensors. One with ordinary skill in the art can appreciate that said zero-crossing point is not necessarily a point with zero value, but a point between a positive value and a negative value.

In view of the above, one skilled in the art can realize that the differential signals are generated from two or more pairs of sensors that constitute an even or odd number of sensors adjacent or not adjacent to one another, wherein the subtrahend is the signal of the sensor closer to the middle of the constituting sensors, and the minuend is the signal of the sensor further from the middle of the constituting sensors.

One with ordinary skill in the art can also appreciate that the touch location detector 42 can be arranged within or outside of the sensing unit (or the above control device). For example, the touch location detector 42 can be arranged within the sensing unit (or the above control device) for providing touch locations in the form of touch locations or some other forms to a host. As another example, the sensing unit provides a signal value of each sensor to a host, and the touch location detector 42 can be arranged within the host or implemented by the host.

Accordingly, one skilled in the art can recognize that the generation of the differential signals in the present invention may include but not limited to sensing each sensor's signal and then generating differential signals, or simultaneously sensing a plurality of sensors' signals and then generating differential signals. In other words, differential signals can be derived from signals of a plurality of sensors, the differences between signals of multiple pairs of sensors, or simultaneously summing the differences between signals of multiple pairs of sensors.

In addition, one skilled the art should recognize that the method and device for detecting touch locations using differential signals according to the present invention includes but is not limited to capacitive, resistive, surface acoustic wave or optical touch devices, or any other devices that can generate one dimensional (lateral or longitudinal plane) or two dimensional continuous signals in response to touches.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A device for automatically calibrating touch detection, comprising:
   a sensing layer including a plurality of sensors, each sensor sensing a sensing range, and the sensing ranges of the sensors intersecting each other to form a crossing array; and
   a sensing unit including:
      a sensing circuit for performing the operations of:
         continuously detecting signals of the sensors as a detection signal set; and
         when a default signal set does not match an initial signal set and the default signal set matches the detection signal set, performing update of the initial signal set.

2. The device for automatically calibrating touch detection according to claim 1, wherein the sensing unit further includes determining a location of at least one external object based on the detection signal set when the default signal set does not match the initial signal set and the default signal set does not match the detection signal set.

3. The device for automatically calibrating touch detection according to claim 1, wherein the sensing unit further includes determining a location of at least one external object based on the detection signal set when the default signal set matches the initial signal set.

4. The device for automatically calibrating touch detection according to claim 1, wherein the update of the initial signal set is performed continuously until the default signal set matches the initial signal set.

5. The device for automatically calibrating touch detection according to claim 1, wherein matching of the default signal set and the initial signal set includes matching of a value representing the default signal set and a value representing the initial signal set and/or matching of the default signal set and the detection signal set includes matching of a value representing the default signal set and a value representing the detection signal set.

6. The device for automatically calibrating touch detection according to claim 1, wherein the sensing layer includes a plurality of first sensors and a plurality of second sensors, the first sensors and the second sensors overlapping at a plurality of intersecting points.

7. The device for automatically calibrating touch detection according to claim 1, wherein each value of the detection signal set corresponds to a differential signal of a different pair of sensors, and a pair of sensors to which each value corresponds have at least one sensor that is different from another pair of sensors to which another value corresponds, wherein the detection signal set includes at least one zero-crossing point when the at least one external object touches the sensors.

8. The device for automatically calibrating touch detection according to claim 1, wherein each value of the detection signal set corresponds to a difference between differential signals of two pairs of sensors among three sensors, and three sensors to which each value corresponds have at least one sensor that is different from three sensors to which another value corresponds, wherein the detection signal set include an even number of zero-crossing points when the at least one external object touches the sensors.

9. The device for automatically calibrating touch detection according to claim 8, wherein the three different sensors among the sensors are not adjacent to one another.

10. The device for automatically calibrating touch detection according to claim 1, wherein the sensing unit includes a storage element for storing the default signal set and the initial signal set.

11. A method for automatically calibrating touch detection, comprising:
   providing a sensing layer including a plurality of sensors, each sensor sensing a sensing range, and the sensing ranges of the sensors intersecting each other to form a crossing array;
   continuously detecting signals of the sensors as a detection signal set;
   performing update of an initial signal set based on the detection signal set; and
   when a default signal set does not match the initial signal set and the default signal set matches the detection signal set, performing update of the initial signal set.

12. The method for automatically calibrating touch detection according to claim 11, further comprising determining a location of at least one external object based on the detection signal set when the default signal set does not match the initial signal set and the default signal set does not match the detection signal set.

13. The method for automatically calibrating touch detection according to claim 11, further comprising determining a location of at least one external object based on the detection signal set when the default signal set matches the initial signal set.

14. The method for automatically calibrating touch detection according to claim 11, wherein the update of the initial signal set is performed continuously until the default signal set matches the initial signal set.

15. The method for automatically calibrating touch detection according to claim 11, wherein matching of the default signal set and the initial signal set includes matching of a value representing the default signal set and a value representing the initial signal set and/or matching of the default signal set and the detection signal set includes matching of a value representing the default signal set and a value representing the detection signal set.

16. The method for automatically calibrating touch detection according to claim 11, wherein the sensing layer includes a plurality of first sensors and a plurality of second sensors, the first sensors and the second sensors overlapping at a plurality of intersecting points.

17. The method for automatically calibrating touch detection according to claim 11, wherein each value of the detection signal set corresponds to a differential signal of a different pair of sensors, and a pair of sensors to which each value corresponds have at least one sensor that is different from another pair of sensors to which another value corresponds, wherein the detection signal set includes at least one zero-crossing point when the at least one external object touches the sensors.

18. The method for automatically calibrating touch detection according to claim 11, wherein each value of the detection signal set corresponds to a difference between differential signals of two pairs of sensors among three sensors, and three sensors to which each value corresponds have at least one sensor that is different from three sensors to which another value corresponds, wherein the detection signal set include an even number of zero-crossing points when the at least one external object touches the sensors.

19. The method for automatically calibrating touch detection according to claim 18, wherein the three different sensors among the sensors are not adjacent to one another.

* * * * *